United States Patent [19]
Rokutan

[11] Patent Number: 5,157,644
[45] Date of Patent: Oct. 20, 1992

[54] OPTICAL CARD RECORDING/REPRODUCING APPARATUS

[75] Inventor: Takao Rokutan, Higashimurayama, Japan

[73] Assignee: Olympus Optical Co., Ltd., Tokyo, Japan

[21] Appl. No.: 702,779

[22] Filed: May 17, 1991

[30] Foreign Application Priority Data

May 29, 1990 [JP] Japan .................................. 2-139186

[51] Int. Cl.$^5$ .............................................. G11B 7/08
[52] U.S. Cl. ............................... 369/44.11; 369/44.14;
369/44.29; 235/454
[58] Field of Search ............... 369/44.11, 44.14, 44.26,
369/44.32, 44.34, 44.41, 30, 50, 53–58, 100, 110,
112, 116, 44.28, 44.29, 44.35, 44.25; 235/454,
487, 494; 250/201.5

[56] References Cited

U.S. PATENT DOCUMENTS

| | | | |
|---|---|---|---|
| 4,910,725 | 3/1990 | Drexler et al. | 235/494 |
| 4,918,415 | 4/1990 | Hashimoto et al. | 235/454 |
| 5,003,523 | 3/1991 | Wachi et al. | 369/44.34 |
| 5,038,332 | 8/1991 | Sakagami et al. | 235/494 |
| 5,059,774 | 10/1991 | Kubo et al. | 235/494 |

Primary Examiner—Roy N. Envall, Jr.
Assistant Examiner—Hung Dang
Attorney, Agent, or Firm—Frishauf, Holtz, Goodman & Woodward

[57] ABSTRACT

An optical card recording/reproducing apparatus includes a holding member for holding a recording medium inserted to perform data recording/reproducing. An optical head includes a converging lens for converging a light beam for recording/reproducing on the recording medium. A position control section moves the holding member and optical head by a predetermined distance to conform the converging position of the converging lens to the position of the recording medium close to the holding member. A focus search circuit searches a focal point by changing the distance between the converging lens and recording medium at the position close to the holding member, and outputs an in-focus detection signal. A focus control section controls the distance between the converging lens and recording medium to maintain a focal relationship between the converging lens and recording medium in response to the in-focus detection signal output from the focus search circuit.

6 Claims, 7 Drawing Sheets

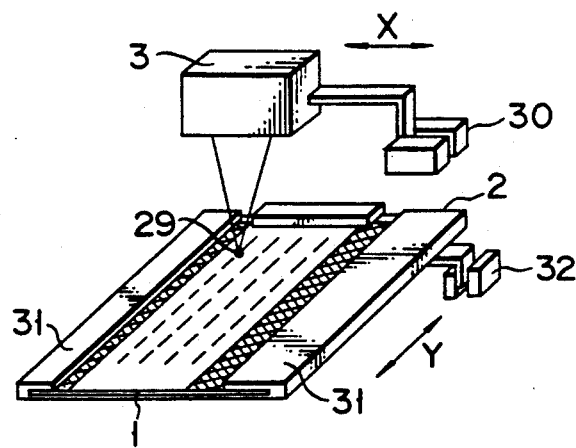
F I G. 1
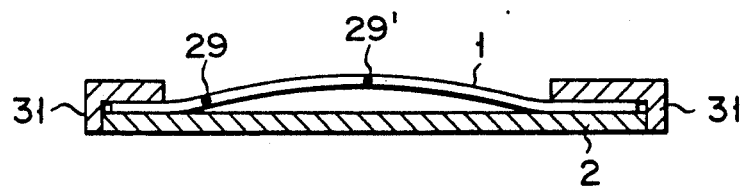
F I G. 2
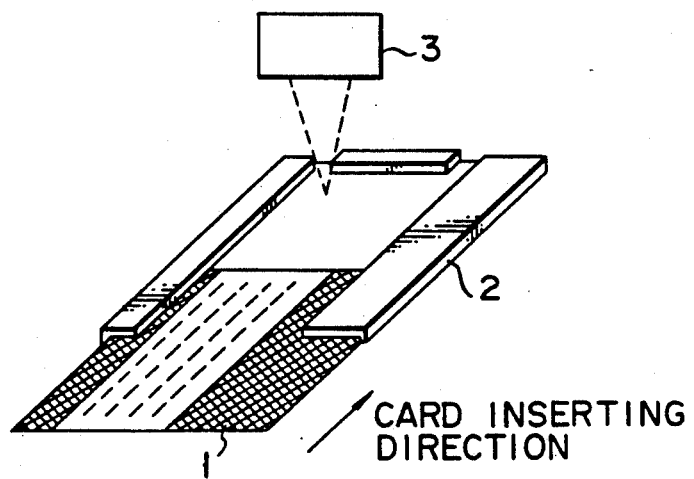
F I G. 3

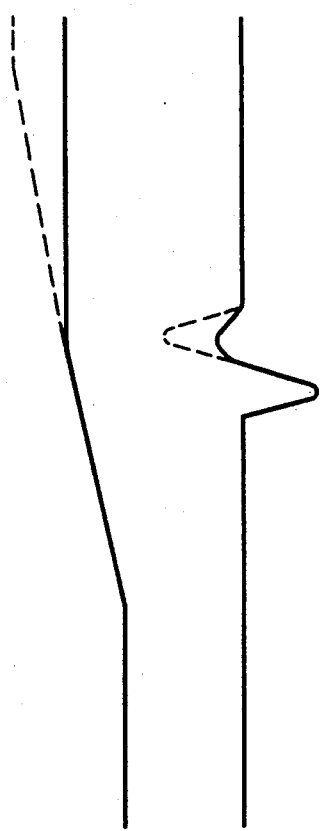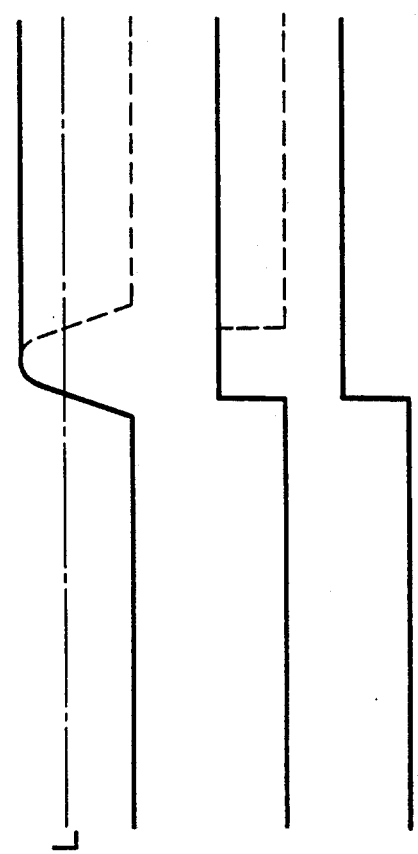
FIG. 12A SEARCH SIGNAL
FIG. 12B FOCUS ERROR SIGNAL
FIG. 12C ADDING SIGNAL
FIG. 12D IN-FOCUS DETECTION SIGNAL
FIG. 12E FOCUS-ON SIGNAL

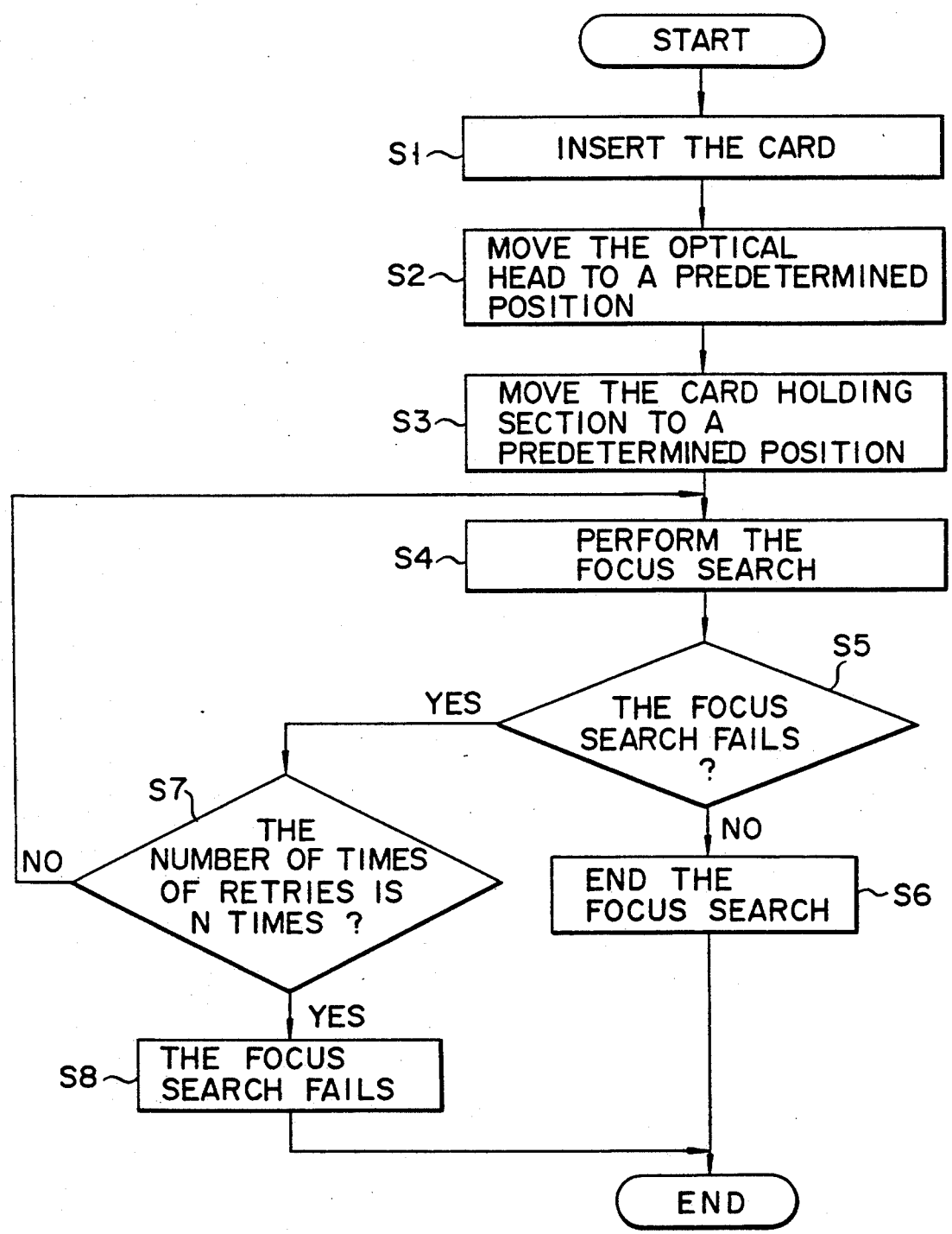
F I G. 13

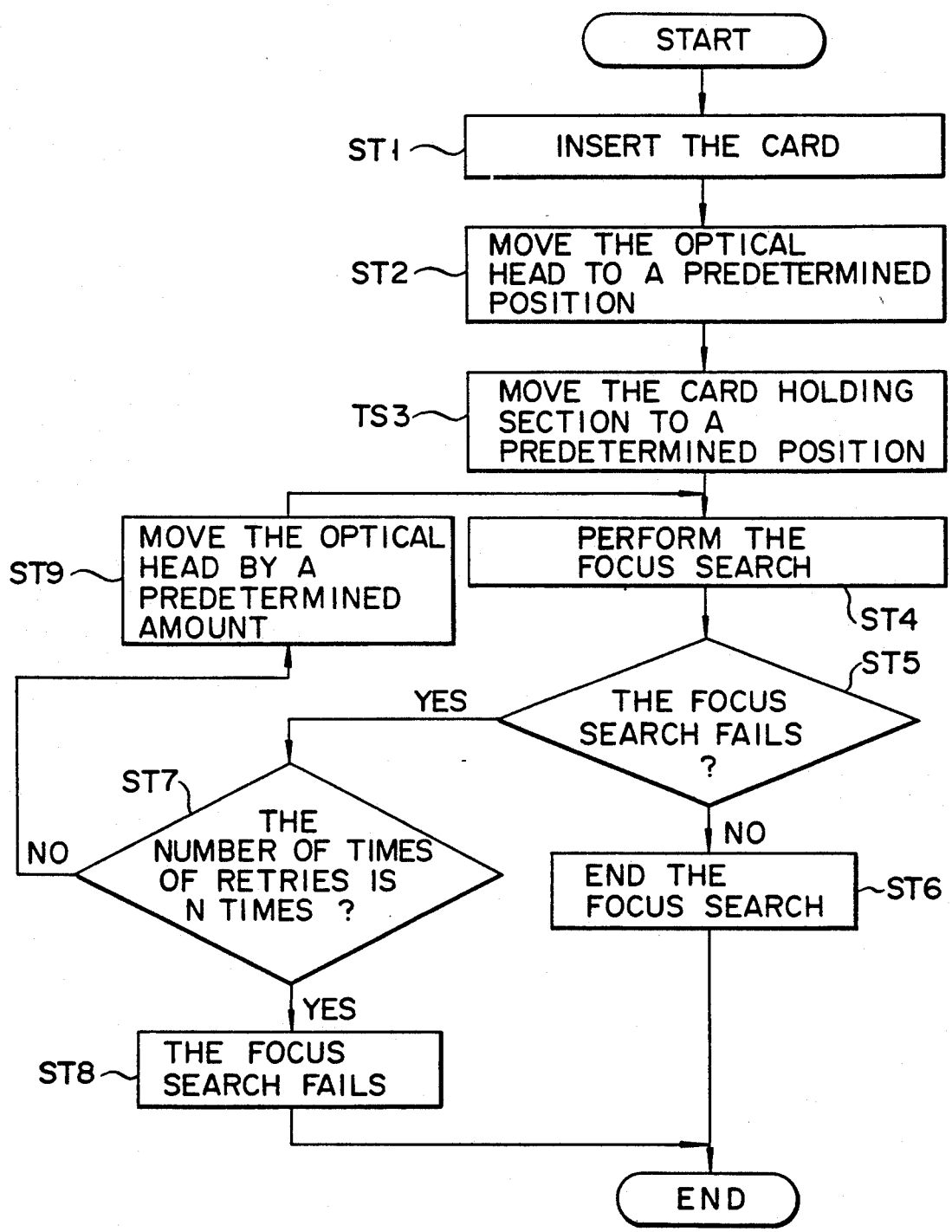
F I G. 14

OPTICAL CARD RECORDING/REPRODUCING APPARATUS

BACKGROUND OF THE INVENTION

1. Field of the Invention

The present invention relates to an optical card recording/reproducing apparatus which records or reproduces data by use of an optical card.

2. Description of the Related Art

In an optical card recording/reproducing apparatus, an optical card serving as a recording medium and an optical head are relatively moved, and data recording or reproducing is performed.

If the optical card is completely inserted into a card holding section, a recording/reproducing beam is radiated to the optical card from the optical head, and a focus search for searching a focal point of the beam to the optical card is started.

In general, in the optical card recording/reproducing apparatus, it has been known that there occurs an error in a relative distance between the optical head and the optical card due to a mechanical attaching error of the optical head and the card holding section and a curvature of the optical card itself. Therefore, the search range of the focus search is set to compensate for the error range of the relative distance between the optical head and the optical card.

However, in the conventional focus search method, since a position on the card where the focus search is to be performed is not specified, the range of the focus search extends due to the error of the curvature of the card. Because of this, there is disadvantage in that the focus searching time is increased. Particularly, in the optical card recording/reproducing apparatus, since the access of the card is repeated many times when the card is used, increase in focus searching time resulted in increase in waiting time of the card user, that is, from the time when the card is inserted till the time when the recording/reproducing can be performed.

SUMMARY OF THE INVENTION

Accordingly, an object of the present invention is to provide an optical card recording/reproducing apparatus wherein a position on the card where a focus search is performed is set to a portion close to a card holding member where an error due to a curvature of the card becomes minimal, thereby a range of the focus search is made small.

To attain the above object, an optical card recording/reproducing apparatus of the present invention comprises a holding member for holding a recording medium inserted to perform data recording/reproducing; an optical head including means for generating an light beam for recording/reproducing and means for converging said light beam on said recording medium; position control means for moving said holding member and said optical head by a predetermined distance to conform the converging position of said converging means to the position of said recording medium close to said holding member; focus search means for searching a focal point by changing the distance between said converging means and said recording medium at said position close to said holding member, and outputting an in-focus detection signal; and focus control means for controlling the distance between said converging means and said recording medium to maintain a focal relationship between said converging means and said recording medium in response to said in-focus detection signal output from said focus search means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing one embodiment of an optical card recording/reproducing apparatus of the present invention;

FIG. 2 is a view explaining a curvature state of the optical card;

FIG. 3 is a view showing a state that the optical card is inserted into a card holding section;

FIGS. 12A to 12E are time charts showing the signal waveforms of the respective portions of the circuit of FIG. 11; and FIGS. 13 and 14 are flow charts explaining first and second embodiments of the present invention, respectively.

DETAILED DESCRIPTION OF THE PREFERRED EMBODIMENTS

An embodiment of the optical card recording/reproducing apparatus of the present invention will be explained with reference to the drawings.

Figure 4:
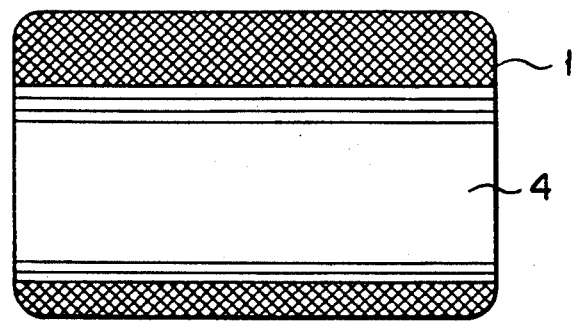
FIG. 4 is a view showing one example of the optical card.
Figure 5:
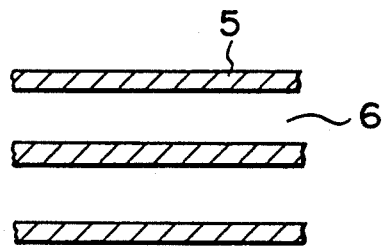
FIG. 5 is a view showing the structure of a data recording section.

As shown in FIG. 4, an optical card 1 has a data recording section 4 for recording desired data. In the data recording section 4, there are guide tracks 5 arranged with a predetermined distance as shown in FIG. 5. Then, data is recorded in tracks 6 between the guide tracks 5.

In a case where desired data is recorded/reproduced in the optical card 1, the optical card 1 is automatically or manually inserted into a card holding section 2 in a direction of an arrow as shown in FIG. 3. When the optical card 1 is completely inserted into the card holding section 2, a light beam is radiated to the optical card 1 from an optical head 3, and the positional relationship between the optical head 3 and the optical card 1 is changed, so as to search a focal point of the beam to the optical card 1. This operation is called a focus search.

Moreover, there is performed a focus servo for controlling the recording/reproducing light beam to be always in a focal state to the optical card 1. Also, there is performed a track servo for controlling the recording/reproducing light beam to be always positioned at the central position of the track of the optical card 1. In order to perform the above controlling operations, there are used a focus error signal showing a shift from a focal point and a track error signal showing a positional shift from the central position of the track.

Figure 6:
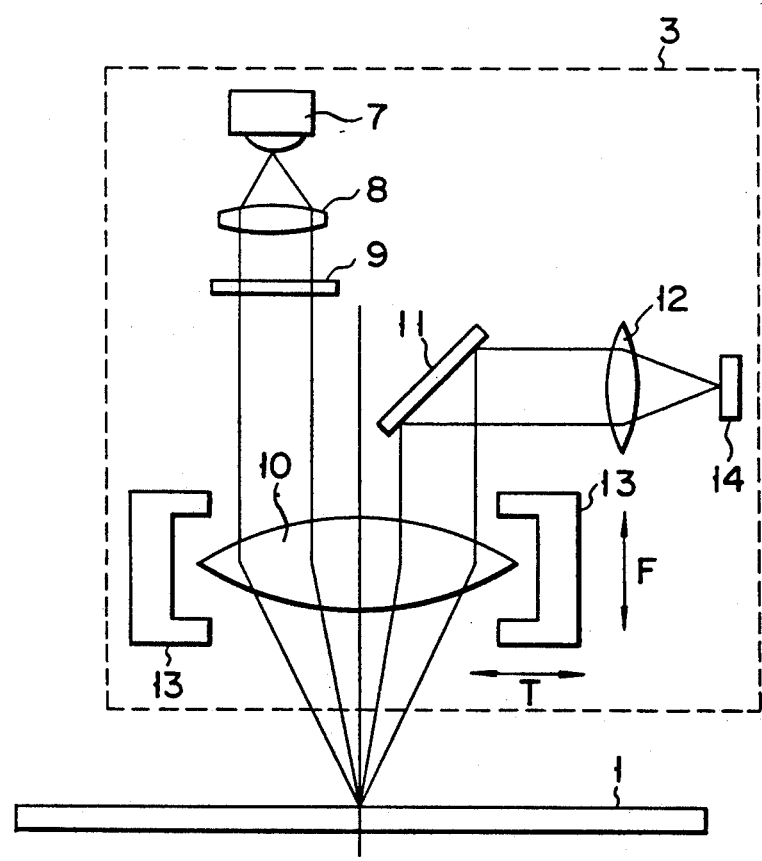
FIG. 6 is a view showing a structural view of an optical head.

FIG. 6 is a view showing a structural view of the optical head 3. The light beam, which is emitted from a semiconductor laser 7 by turning on the semiconductor laser 7, is converted into a parallel beam by a collimator lens 8, and the parallel beam is divided into three beams by a diffraction grating 9. The beam is converged on the optical card 1 by a converging lens 10. In this embodiment, an axis of the light beam entering the optical card 1 and an axis of the beam reflecting from the optical card 1 shift from the central axis of the converging lens 10 (a detecting method of the focus error signal using this point is called an axis shifting method). The reflected beam from the optical card 1 is reflected on a mirror 11, passes through a detection system lens 12, and is radiated to an optical detector 14.

Figure 7:
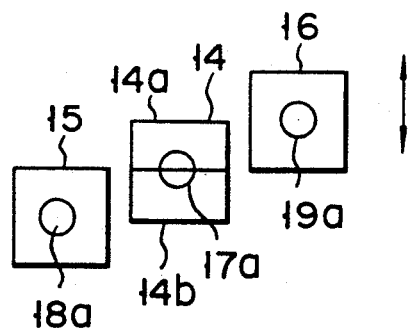
FIG. 7 is a view showing a state that a reflected light beam is radiated to an optical detector.

FIG. 7 shows a state that the beams are radiated to the optical detector 14 as structured in the drawing. Among three beams, a central beam (main beam) 17a is radiated to the detector 14 which is divided into detectors 14a and 14b. Beams 18a and 19a (sub beam) are respectively radiated to detectors 15 and 16. The detectors 14a and 14b are used to detect the above-mentioned focus error signal. In this case, the converging lens 10 is driven by a lens driving section 13 in a direction of F in the drawing. Also, the detectors 15 and 16 are used to detect the track error signal. In this case, the converging lens 10 is driven by the lens driving section 13 in a direction of T in the drawing.

As long as the beam 17a is in a focal state, the beam is positioned at the center of the optical detector 14 as shown in FIG. 7. However, as mentioned above, since the axis of the beam is shifted, the beam moves in a direction of an arrow of FIG. 7 when the distance between the converging lens 10 and the optical card 1 changes.

Figure 8:
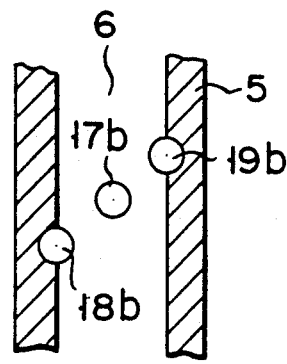
FIG. 8 is a view showing a state that a light beam is radiated to an optical card.

FIG. 8 shows a state that three beams are radiated to the optical card 1. The beams 17a, 18a, and 19a correspond to beams 17b, 18b and 19b, respectively.

Figure 9:
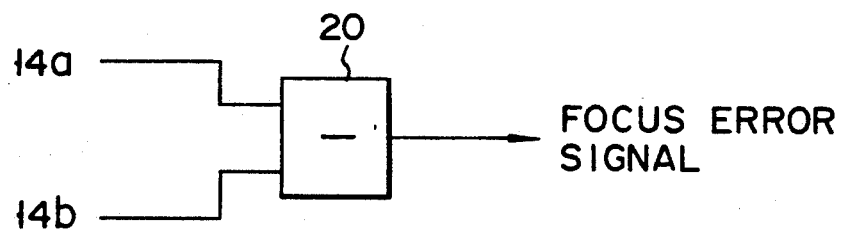
FIG. 9 is a view showing a subtracter which outputs a focus error signal.
Figure 10:
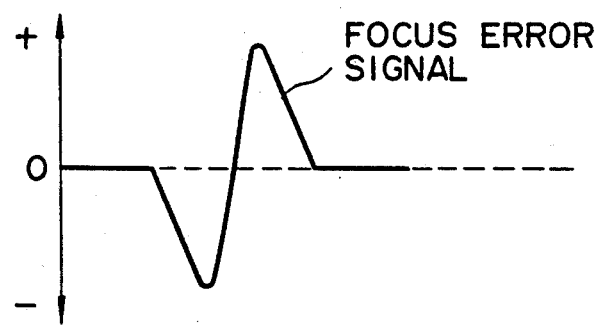
FIG. 10 is a view showing a waveform of the focus error signal.

An electrical signal is output from detectors 14a and 14b in accordance with a quantity of incident light, and is supplied to a subtracter 20 shown in FIG. 9. The subtracter 20 outputs a result of the subtraction of two signals, and this serves as a focus error signal. FIG. 10 shows a waveform of such a focus error signal.

On the other hand, the track error signal can be obtained as a difference between the output of the optical detector 15 and that of the optical detector 16.

Figure 11:
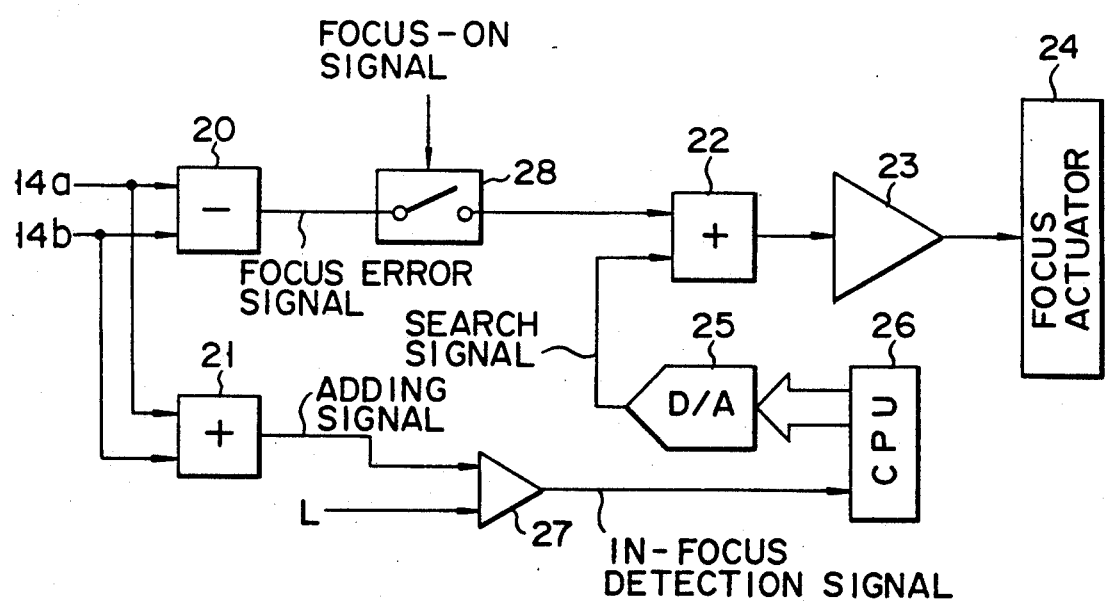
FIG. 11 is a view showing the structure of a focus search circuit.

FIG. 11 is a circuit diagram for realizing the above-mentioned focus search and the focus servo.

A general operation of the circuit of the focus search will be explained with reference to FIG. 11.

If the focus search is performed, a focus servo loop is in an opening state by opening a switch 28. At this time, a CPU 26 changes an output of a D/A converter 25, and generates a search signal as shown in FIG. 12A. The search signal is supplied to a power amplifier 23 through a subtracter 22. The output sent from the power amplifier 23 is supplied to a focus actuator 24, so that the converging lens 10 gradually moves to a separating direction from the optical card 1 or a direction of approaching the optical card 1.

If the converging lens 10 and the recording surface of the optical card 1 approach the focal relationship, an adding signal (FIG. 12C), which is sent from an adder 21 adding the electrical signals from the optical detectors 14a and 14b, starts to increase. The adding signal is compared with a reference comparison level L by a comparator 27. Then, if the adding signal exceeds the reference comparison level L, the comparator 27 outputs an in-focus detection signal as shown in FIG. 12D and informs to CPU 26 that the in-focus state has been obtained. CPU 26 changes a focus-on signal (FIG. 12E) to be active and closes a switch 28 in response to the in-focus detection. In this manner, the focus servo loop is closed, and the focus servo starts to operate.

FIG. 12B shows the focus error signal, however this was already mentioned and the explanation thereof will be omitted.

A dotted line portion of each signal waveform shown in FIGS. 12A to 12D shows a waveform when an in-focus state cannot be obtained by the focus search.

Now, a focus search relating to the first embodiment of the present invention will be explained with reference to the flow chart of FIG. 13.

First, the optical card 1 is automatically or manually inserted into the card holding section 2 in a direction of an arrow of FIG. 3 (STEP S1). After the optical card 1 is completely inserted into the card holding section 2, the optical head 3 is moved in an X direction by a predetermined distance, the card holding section 2 is moved in a Y direction by a predetermined distance (STEPs S2 and S3). Position sensors 30 and 32 are attached to the optical head 3 and the card holding member 31, respectively. Then, when the optical head 3 and the card holding section 2 move, the position sensors 30 and 32 detect the amount of the movement. The obtained detection signals are respectively sent to CPU 26, and the position is discriminated.

By the movement, the converging position of the converging lens 10 shown in FIG. 6 is controlled to conform to a position 29 of the optical card 1. FIG. 2 is a view of the above state seeing from the card insertion direction. As is obvious from the drawing, the position 29 is placed close to the card holding member 31. The error due to the curvature of the optical card 1 is small as compared with, for example, the central position (position shown by reference numeral 29') of the optical card 1. Therefore, according to the present invention, it is possible to make the focus search range smaller.

Thereafter, the focus search is performed (STEP S4), and it is discriminated whether or not the focus search fails (STEP S5). If it is discriminated that the focus search succeeds, the focus search is ended (STEP S6). If it is discriminated that the focus search fails, a retry operation is performed. In Step S7, it is discriminated whether or not the number of times of retries is N times. Then, if the number of times of retries is not N times, step S4 and the following steps are repeated. If the number of times of retries is N times, it is discriminated that the focus search fails (Step S8), and a predetermined process is provided and the focus search is ended.

As is obvious from the above explanation, according to the present invention, the focus search range can be made smaller, but the position on the optical card 1 where the focus search is performed is fixed (position 29 of FIGS. 1 and 2 in this embodiment). Due to this, if there are defects such as dust and a flaw in the position, the focus search does not succeed even if the retries are repeated.

A second embodiment of the present invention has been made to solve the above problem and the second embodiment will be explained with reference to the flow chart of FIG. 14.

The operation, which is from the case in which the optical card 1 is inserted to the case in which the focus search is performed, is the same as the operation of the first embodiment (Steps ST1 to ST4).

At this time, if there are the above-mentioned defects in the position 29 where the focus search is performed, the light beam emitted from the optical head 3 is not normally reflected from the optical card 1, and the focus search cannot be performed. In this case, as mentioned above, since the position of the focus search is fixed, the focus search cannot succeed even if the focus search is repeated, and the discrimination in step ST5 is Yes.

According to the second embodiment, after discriminating the number of times of retries in step ST7, the optical head 3, the card holding section 2, or the converging lens 10 is moved by a predetermined amount, thereby the focus search excepting the defective portion of the optical card 1 is performed (Step ST9).

Since the maximum size of the defective portion is normally about 1 mm, the detective portion can be surely avoided by moving, say, the optical head 3 by about 2 to 3 mm. For this reason, the focus search succeeds by the retry operation. The other operations of the second embodiment are the same as these of the first embodiment.

The above explained the first and second embodiments of the present invention, but the present invention is not limited to the above embodiments and various changes and modifications can be made.

As mentioned above, the present invention can provide an optical card recording/reproducing apparatus wherein a position on the card where a focus search is performed is set to a portion close to a card holding member where an error due to a curvature of the card becomes minimum, thereby a range of the focus search is made small.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical card recording/reproducing apparatus comprising:
   a holding member having means for holding a recording medium inserted to perform data recording/reproducing, said recording medium having an attachment portion engaged by said holding member, a first recording portion and a second recording portion, said first recording portion being closer to said attachment portion than is said second recording portion;
   an optical head including means for generating a light beam for recording/reproducing and means for converging said light beam on said recording medium;
   position control means for moving said holding member and said optical head relative to each other by a predetermined distance to locate a converging position of said converging means at a position of said first recording portion;
   focus search means for searching for a focal point by changing a distance between said converging means and said recording medium at said converging position, and for outputting an in-focus detection signal when said focal point is found; and
   focus control means for controlling said distance between said converging means and said recording medium to maintain a focal relationship between said converging means and said recording medium in response to said in-focus detection signal output from said focus search means.

2. The apparatus according to claim 1, wherein said position control means includes means for moving one of said optical head, holding member, and converging means by a predetermined distance, when said focal point cannot be searched by said focus search means.

3. The apparatus according to claim 1, wherein said focus search means includes a pair of detecting means for detecting a reflected beam from said recording medium, adding means for adding each detected output from said paired detecting means, and comparing means for comparing an adding result of said adding means with a reference level, and when the adding result exceeds said reference level, an in-focus detection signal is output.

4. A method for recording/reproducing with an optical card comprising the steps of:
   holding a recording medium inserted to perform data recording/reproducing, with an attachment portion of said recording medium being held by a holding member, and said recording medium having a first recording portion and a second recording portion, with said first recording portion being closer to said attachment portion than is said second recording portion;
   with an optical head, generating a light beam for recording/reproducing, and converging said light beam on said recording medium with a converging means;
   locating a converging position of said converging means at a position of said first recording portion;
   searching for a focal point by changing a distance between said converging means and said recording medium at said converging position, and outputting an in-focus detection signal when said focal point is found; and
   controlling said distance between said converging means and said recording medium to maintain a focal relationship between said converging means and said recording medium in response to said in-focus detection signal.

5. The method according to claim 4, wherein said locating step comprises moving one of said optical head, holding member, and converging means for a predetermined distance, when said focal point cannot be searched.

6. The method according to claim 4, wherein said searching step comprises detecting a reflected beam from said recording medium with a pair of detecting means, adding each detected output from said paired detecting means, and comparing an adding result of said adding step with a reference level, and when the adding result exceeds said reference level, outputting said in-focus detection signal.

* * * * *